Nov. 29, 1938.  E. ALTENKIRCH  2,138,686
INTERMITTENT ABSORPTION REFRIGERATING APPARATUS
Original Filed Feb. 26, 1934
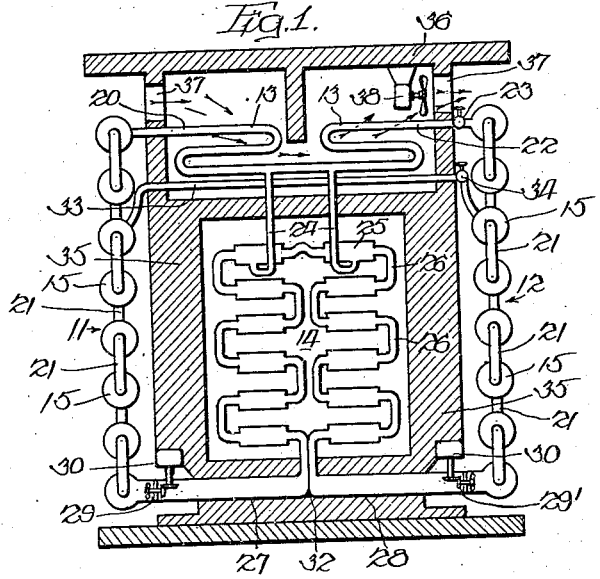
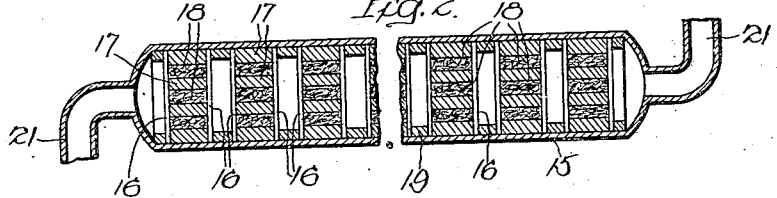
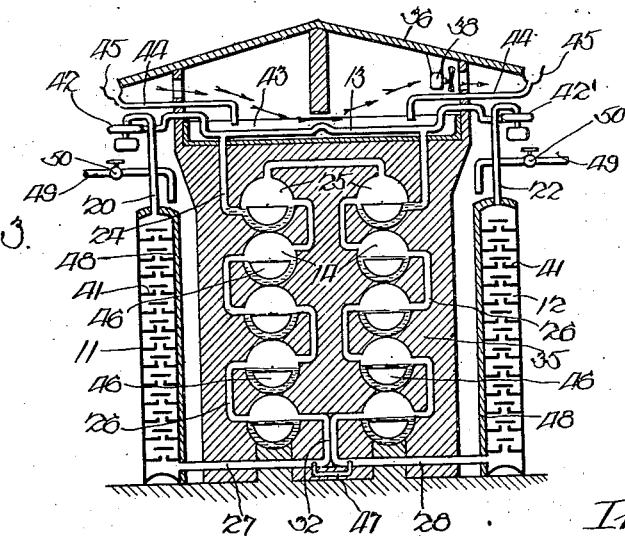
Inventor:
Edmund Altenkirch
By Harry S. Demarse
Atty.

Patented Nov. 29, 1938

2,138,686

UNITED STATES PATENT OFFICE 2,138,686

INTERMITTENT ABSORPTION REFRIGERATING APPARATUS

Edmund Altenkirch, Neuenhagen, near Berlin, Germany

Application February 26, 1934, Serial No. 712,862.
Renewed October 26, 1938. In Germany February 28, 1933

25 Claims. (Cl. 62—119.5)

This invention relates to intermittent absorption refrigerating apparatus, and more particularly to a system adapted to produce refrigeration without the necessity of a high difference in temperature existing between the boiler or generator and the condenser.

Intermittent absorption refrigerating apparatus of a type in which vessels called absorber-generators are employed is well known. These vessels are alternately heated so as to deliver vapor to a condenser where it is condensed and conveyed to the evaporator. In this type of apparatus cooling effect may be produced practically continuously the vapor developed in the evaporator being conveyed to the absorber-generator which is not being heated.

It is also well known to employ an inert gas in the absorber and evaporator of a continuous absorption refrigerating system so as to permit the apparatus to operate with the pressure substantially the same in the various parts.

In accordance with the present invention it is proposed to provide intermittent absorption refrigerating apparatus with an inert gas, the inert gas passing over a cycle which includes both absorber-generators, the evaporator and the condenser, the difference in refrigerant pressure necessary for the change of state which must occur if refrigeration is to be produced, being brought about by varying the partial pressures of the refrigerant and inert gas in the various vessels. By such an apparatus only a small temperature difference between the absorber-generator being heated and absorber-generator not being heated is necessary in order to produce fairly low temperatures in the evaporator. Waste heat of low temperature can accordingly be used to carry out the principles of the invention or the difference in temperature existing on the sunny side of the house and that on the shady side can be used. A difference in temperature may also be produced by subjecting one absorber-generator to cooling water or to water in a spray pond or which has come from a spray pond while the other absorber-generator is not subjected to cooling water of any kind. This is particularly suitable for dry climates and refrigeration may be produced even if the sun is not shining. Of course if the sun is shining on the absorber-generator which is not being cooled by water, additional refrigerating effect will be produced.

It is also possible under certain conditions to cause the apparatus constructed in accordance with the principles of the invention to operate without the use of moving parts, although in the following description moving parts are indicated as being useful.

Accordingly it is one object of the invention to provide an hermetically sealed intermittent absorption refrigerating apparatus adapted to produce refrigeration by utilizing heat of relatively low temperature.

It is another object of the invention to provide an intermittent absorption refrigerating apparatus in which inert gas is employed.

It is a still further object of the invention to provide an intermittent absorption refrigerating apparatus in which the heat of the sun may be utilized or which operates in response to the difference in temperature brought about by cooling a vessel due to evaporation of water thereon without the use of the sun or other heating means except the heat of the atmosphere.

Various other objects and advantages will be apparent from the following description taken in connection with the accompanying drawing in which:

Figure 1 is a diagrammatic illustration of an intermittent absorption refrigerating apparatus constructed in accordance with the principles of the invention, a portion of the housing which surrounds the evaporator being shown in vertical cross section.

Figure 2 is a vertical cross sectional view of one of the horizontal pipes which make up the absorber-generators of Figure 1, and Figure 3 is a diagram showing another embodiment of the invention.

Referring to the drawing in detail, and particularly to the embodiment of Figures 1 and 2, it will be seen that the intermittent absorption refrigerating apparatus there shown consists of two absorber-generators designated generally as 11 and 12, a condenser designated 13 an evaporator 14 and various conduits and auxiliary apparatus which go to make up the complete system.

Each of the absorber-generators 11 and 12 consist of a number of horizontally extending pipes designated 15, one of which is shown in cross section in Figure 2. Each of the pipes 15 contain absorption material, such as silica gel or charcoal. Sulphur dioxide, alcohol, especially methylalcohol, or water may be used as refrigerant with this substance. The invention is not limited to the use of solid absorbents, however, and alkali solutions, sulphuric acid and water may be used as absorbents provided the vessels 15 are so constructed as to adapt them for such use, and ammonia, ethylamines, acetaldehyde or various other substances may be used as refrigerants.

In the arrangement shown in Figures 1 and 2 the pipes 15 are particularly adapted for the use of silica gel as absorbents because this substance swells as it absorbs refrigerant. The interior of the vessel is divided by means of a number of vertical screens or perforated partitions designated 16 as shown in Figure 2. Alternate spaces between partitions 16 are provided with metal rings 17 arranged concentrically to provide space for the silica gel shown at 18. Spacers 19 hold partitions 16 in position. The spacers 19 may be made of yielding material so as to permit expansion and contraction of the gel as it absorbs or gives up the refrigerant or the partitions 16 may be made of resilient material.

As shown in Figure 1 the pipes 15 are arranged horizontally one above the other, and are connected at their alternate ends to one another by means of pipes 21. The upper horizontal pipe 15 of each of the absorber-generators 11 and 12 is connected to the condenser 13 by means of pipe 20 or 22, the latter of which is provided with a valve as shown at 23.

The condenser 13 is connected to the evaporator 14 by means of one or more pipes 24, two being shown in Figure 1, which extend downwardly below the upper portion of the evaporator and are provided with U-bends to prevent the flow of gas therethrough.

The evaporator 14 may consist of a number of horizontally extending pipes 25 which may be arranged in two banks as shown in Figure 1 and have their alternate ends connected by pipes 26. The lower end of the left hand bank of the evaporator 14 is connected to the absorber-generator 11 by means of the pipe 27, while the lower end of the right hand bank of the evaporator 14 is connected to the absorber-generator 12 by means of the pipe 28. Pipes 27 and 28 may each be provided with fans or blowers as indicated at 29 and 29' respectively, these being driven by electric motors 30. The gas pipes 27 and 28 are preferably in heat exchange relation as indicated at 32.

In addition to the pipe 22 and the condenser 13 which connect the upper ends of the absorber-generators 11 and 12, one or more auxiliary pipes 33 are connected to certain of the horizontal pipes 15 of the absorber-generators. Each of the pipes 33 may be provided with a regulating valve 34 so as to control the flow of gas therethrough. It will be apparent that by manipulating the valves 23 and 34 gas can be caused to flow either from one absorber-generator to the other without passing through the condenser or partly through the condensers and partly through pipe 33.

The evaporator 14 is shown surrounded by insulating material 35 which may be in the form of a small house or box which supports the condenser and other parts of the apparatus. In the arrangement shown the condenser 13 is shown as being air cooled, this device being shielded from the heat of the sun by the roof 36 which is provided with openings 37 so arranged as to permit air to circulate over the condenser 13. If desired a motor driven fan such as is shown at 38 may be provided to cause forced circulation over the condenser 13.

It will be seen that in the arrangement shown in Figure 1, a continuous path for the flow of gases is provided as follows: Absorber-generator 11, pipe 20, condenser 13, pipe 22, absorber-generator 12, pipe 28, evaporator 14, pipe 27, and back to the absorber-generator 11. This direction of gas circulation will be as indicated if the centrifugal fan 29 in the conduit 27 is operated, or in exactly the opposite direction if the fan 29' in the pipe 28 is operated. If the fans 29 and 29' are not employed the gas will circulate in the direction described by convection, if the absorber-generator 11 is heated and the absorber-generator 12 is cooled and in the reverse direction to that designated if the heating and cooling of the absorber-generators is reversed. If the fans 29 and 29' are used, they should be so controlled as to cause the reversal of the gas circulation synchronously with the reversal of heating of the absorber-generators 11 and 12.

If the apparatus is so arranged that the absorber-generator 12 is on the east side of the house, and the absorber-generator 11 is on the west side of the house, refrigeration may be produced by the heat of the sun, the absorber-generator 12 being heated in the morning, while the absorber-generator 11 is in the shade, and the absorber-generator 11 being heated in the afternoon while the absorber-generator 12 is in the shade. The absorber-generators may be heated by any source of heat, however, and the invention is not limited to the use of the heat of the sun for producing refrigeration.

Assuming that the apparatus has been carefully dried out and charged with sulphur dioxide as refrigerant and with an inert gas, such as argon, air or nitrogen depending on what pressure is desired, the apparatus will operate as follows:

Assuming that the absorber-generator 12 is heated to a temperature above that prevailing around the condenser 13 and the absorber-generator 11 (which is air cooled in Fig. 1), and that the fan 29' is operated, the inert gas will pass upwardly through the absorber-generator 12 and in so doing will absorb the refrigerant out of the silica gel therein. If the apparatus has been operated before, the gel at the top of the absorber-generator 12 will be more saturated with sulphur dioxide than the lower portion. This will cause a higher saturation of sulphur dioxide in the inert gas leaving the absorber-generator 12 through the conduit 22 than that which exists part way down the absorber-generator 12 and which may pass through the intermediate connecting pipe 33 without going through the condenser.

The inert gas heavily laden with sulphur dioxide passes into the condenser 13 and since this is at a lower temperature than the absorber-generator 12 the refrigerant will condense therein and flow into the evaporator 14 through the pipe or pipes 24. The inert gas will continue on its way from the condenser 13 through the pipe 20 and pass downwardly through the absorber-generator 11. The inert gas flowing downwardly through the absorber-generator 11 will have less refrigerant content than that which entered the condenser, but sufficient to permit the silica gel in absorber-generator 11 to absorb a considerable quantity. The inert gas will then flow through the conduit 27 into the evaporator, as nearly pure inert gas. As it comes in contact with the liquid refrigerant in the evaporator 14, the refrigerant will, of course, evaporate to produce refrigeration. The mixture of inert gas and refrigerant gas will then pass out of the bottom of the evaporator through the conduit 28 and flow back to the absorber-generator 12 where the refrigerant content of the gas will be further increased due to this vessel being heated.

After continuing the cycle in this direction for a sufficient period of time to permit the gel in the absorber-generator 12 to be dried out insofar as practical, the direction of circulation of the inert gas is reversed. The absorber-generator 11 is then heated and the centrifugal fan 29 is operated while fan 29' is stopped. Since the parts are duplicates it will be apparent from what has previously been described that the system will continue to operate just as described in the foregoing except for the reversal of direction of flow of the inert gas and the relative temperatures of the absorber-generators.

The duration and intensity of the heating period as well as the quantity of gel or other absorbent material in the vessels 11 and 12 and the velocity of the gas circulation must be carefully controlled and harmonized with each other if the best results are to be obtained with the apparatus. The fans 29 and 29' and the valve 23 and 34 provide means for accurately controlling the gas circulation not only through the condenser 13, but also through the absorber-generators 11 and 12 independently of the condenser 13, the conduit 33 providing means for by-passing some of the inert gas from the condenser 13. These devices may of course be operated automatically in response to temperature conditions in various parts of the apparatus, or can be varied in response to the timing of the heating period.

If artificial heating is used, the heating can of course be interrupted at the correct moment. If the apparatus is operated by the sun, the heating periods can be shortened by turning the apparatus at certain times of the day or by reflectors which would direct the heat of the sun on to either of the absorber-generators.

It may be found that under certain conditions the fans 29 and 29' may be dispensed with and the valves 23 and 34 eliminated by regulating the size of the various conduits. It will be apparent to those skilled in the art that the arrangement is such that the desired gas circulation may be effected by convection alone due to the shape of the absorber-generators, there being a tendency for the gases in these vessels as well as in the downwardly extending legs of conduit 33, to pass upwardly as they are heated and downwardly as they are cooled. This effect may of course be increased if the absorber-generator which is not being heated is subjected to a spray of water or other cooling device below the temperature of the air.

It may be possible to employ a spray cooler or other cooling device for the absorber-generator of Figure 1 without heating either of these vessels at all except by heat of the atmosphere. An arrangement designed to produce refrigeration under such conditions is shown in Figure 3. The arrangement of Figure 3 is quite similar to that of Figure 1 and the corresponding parts are similarly designated. Two absorber-generators 11 and 12, are shown connected to a condenser 13, by conduits 20 and 22. The condenser is connected to an evaporator 14 surrounded by insulating material 35. The lower portion of vessels 11 and 12 are connected to the evaporator by means of the gas conduits 27 and 28 portions of which are in heat exchange relation as shown in 32. The absorber-generators 11 and 12 in the arrangement of Figure 3 are illustrated as being adapted for liquid absorbing material. For this purpose, they contain a number of pans diagrammatically represented at 41. Because liquid absorbent is used, it is impractical to locate fans in the gas conduits 27 and 28. Fans 42 and 42' are accordingly located in the gas pipes 20 and 22.

The condenser in the arrangement of Figure 3 is shown as water cooled, it being located in a pan 43, which may be fed with rain water through the pipes 44 connected to the eave troughs 45 on roof 36. The pipes 24 which drain condensate from the condenser 13 into the evaporator 14 may be connected to the upper pipes 25 of the evaporator below the liquid level in pipes 25 so that a liquid seal is maintained without providing U-bends in the pipes 24.

The evaporator of Figure 3 may be the same as that of Figure 1. However, in the form shown each of the horizontal pipes 25 is shown as provided with an inner space 46 adapted to receive an ice pan or other device for utilizing the cold produced. The pipes 25 are connected in series, in so far as gas flow is concerned, by means of the pipes 26 all except the upper one of which may also serve to convey liquid downwardly by gravity from one pipe 25 to the next lower one.

Since some liquid may find its way into the pipes 27 and 28 during operation of the apparatus and since this might block the flow of gases through these pipes, a small liquid U connection should be made between the lower ends of these pipes as indicated at 47. The pipe 47 also serves to convey liquid from one side of the apparatus to the other so that an equal distribution of the liquid working medium is provided in case too much liquid has gone over to one side.

The pipes for by-passing the condenser as are shown in Figure 1 at 33 are not shown in Figure 3 to avoid complicating the showing, but it will be understood that such pipes may be used.

The absorber-generators 11 and 12 of Figure 3 are adapted to be water cooled. To this end one or more surfaces of these devices may be covered with some porous or water-absorbing material such as is indicated at 48. Water may be supplied to these surfaces by means of the supply pipes 49 each of which may be provided with a valve as indicated at 50. The water might also be supplied to the surfaces 48 from the pan 43 under the regulation of known control devices. In the arrangement shown valves 50 may be regulated automatically as to cool one absorber-generator at a time for a definite period, then the other, depending upon conditions existing in various parts of the apparatus.

Fans may be used to direct air over the water in the pan 43 to cool the condenser 13, one such fan being shown at 38. Fans may also be used to blow air over the water absorbing surfaces 48 and cause evaporation therefrom and cool either of the absorber-generators 11 and 12, although these fans are not shown in the drawing.

The operation of the apparatus of Figure 3 will be exactly the same as that described above in connection with Figure 1, the inert gas always circulating upwardly in the absorber-generator which is being heated and downwardly in the absorber-generator which is being cooled. Assuming that the apparatus of Figure 3 is charged with an absorption solution of acetaldehyde and water, with water as the refrigerant, and with air as the inert gas, refrigeration can be produced with the pressure in the apparatus approximately atmospheric and the difference in temperature need not be great. The absorption solution is supplied on the plate 41 in the absorber-generators 11 and 12 and the refrigerant to the condenser and evaporator. The inert gas is circulated through the apparatus, it flowing first from the absorber-generator 11 through the conduit 20, the condenser 13, conduit 22, the absorber-generator 12, the conduit 28, the evaporator 14, and conduit 27 back to the absorber-generator 11. After a period of time the inert gas is circulated over this cycle in the reverse direction. With the gas circulation in the direction first indicated above, if water is supplied to the porous material 48 around the absorber-generator 12 this vessel will be maintained cooler than the absorber-generator 11, due to the evaporation of the water absorbing heat from the absorber-generator 12. Likewise, the condenser 13 will be maintained cooler than the absorber-generator 11 due to the passage of air over the water in the pan 43 and the evaporation of this water. Under the circumstances, refrigerant will be given up by the absorption solution in the absorber-generator 11 and condensed in the condenser 13. This condensate will flow into the evaporator where it will evaporate into the inert gas. The moisture which is not condensed in the condenser 13 will be absorbed by the absorption liquid in the absorber-generator 12.

When the direction of circulation of the air is reversed, the water supply to the porous material on the absorber-generator 12 is shut off and that to the porous material on the absorber-generator 11 is opened, either manually or automatically. The absorber-generator 11 then assumes a lower temperature than the absorber-generator 12 and refrigerant is delivered from the absorber-generator 12 to the condensers 13 and to the absorber-generator 11. In regions where the atmosphere is dry and windy, low temperatures can be produced in this way even if the sun does not shine. The best operation of the apparatus of Figure 3 is of course obtained when the vessels 11 and 12 are alternately heated as well as cooled so as to bring about a greater difference in temperature between them when acting as generators and when acting as absorbers.

While only two embodiments of the invention have been illustrated and described herein, it is obvious that various features illustrated are interchangeable and that many other changes may be made without departing from the spirit of the invention or the scope of the annexed claims.

I claim:

1. Intermittent absorption refrigerating apparatus having vessels comprising two absorber-generators, a condenser, an evaporator and in which refrigerant and an inert gas are circulated, means for alternately circulating an inert gas first through one absorber-generator, the condenser, the other absorber generator, and the evaporator back to the first absorber-generator and then through these same vessels in the reverse order, the arrangement being such that one absorber-generator can be alternately maintained at a different temperature than the other absorber-generator.

2. Intermittent absorption refrigerating apparatus having vessels comprising two absorber-generators, a condenser and an evaporator connected in circuit and containing a refrigerant and an inert gas, means for circulating the inert gas through said circuit, and means for by-passing some of the gas around said condenser.

3. Intermittent absorption refrigerating apparatus having vessels connected in circuit comprising two absorber-generators, a condenser, an evaporator, means for alternately circulating an inert gas first through one absorber-generator, the condenser, the other absorber-generator, and the evaporator back to the first absorber-generator and then through these same vessels in the reverse order, the arrangement being such that while one absorber-generator is being exposed to the heat of the sun the other absorber-generator is unexposed to the sun whereby a temperature difference obtains between said absorber-generators.

4. Intermittent absorption refrigerating apparatus having vessels connected in circuit comprising two absorber-generators, a condenser, an evaporator, means for alternately circulating an inert gas first through one absorber generator, the condenser, the other absorber-generator, and the evaporator back to the first absorber-generator and then through these same vessels in the reverse order and means for alternately cooling one absorber-generator to a temperature below that of the surrounding atmosphere, the other absorber-generator being exposed to the heat of the atmosphere, to maintain a difference in temperature between said absorber-generators.

5. Intermittent absorption refrigerating apparatus having vessels connected in circuit comprising two absorber-generators, a condenser, an evaporator, means for alternately circulating an inert gas first through one absorber-generator, the condenser, the other absorber-generator, and the evaporator back to the first absorber-generator, the arrangement being such that one absorber-generator may be periodically maintained at a higher temperature than the other absorber-generator, and such that the direction of flow of inert gas is reversed in synchronism with the alternate heating of said absorber-generators.

6. Intermittent absorption refrigerating apparatus having vessels connected in circuit comprising two absorber-generators, a condenser, an evaporator, means for alternately circulating an inert gas first through one absorber-generator, the condenser, the other absorber-generator, and the evaporator back to the first absorber-generator, the arrangement being such that one absorber-generator may be periodically maintained at a higher temperature than the other absorber-generator, and such that the direction of flow of inert gas is reversed in synchronism with the alternate heating of said absorber-generators and the circulation of the inert gas is induced by convection resulting from the alternate heating of said absorber-generators.

7. The process of producing refrigeration which consists in circulating an inert gas into the presence of a refrigerant laden absorbent body, maintaining the absorbent at a sufficiently high temperature to cause the refrigerant to be given up to the inert gas, conveying the refrigerant laden inert gas away from the absorbent and cooling the same to cause some of the refrigerant to condense, conveying the inert gas, still containing some refrigerant into the presence of another absorbent body and maintaining this body at a sufficiently low temperature to cause it to absorb some refrigerant out of the inert gas, conveying the nearly pure inert gas into the presence of the condensed refrigerant to cause the condensed refrigerant to evaporate into the inert gas and produce a cooling effect and conveying the mixture of inert gas and refrigerant so obtained back into the presence of the first mentioned absorbent body.

8. The process of producing refrigeration which consists in circulating an inert gas into the presence of a refrigerant laden absorbent body, maintaining the absorbent at a sufficiently high temperature to cause the refrigerant to be given up to the inert gas, conveying the refrigerant laden inert gas away from the absorbent and cooling the same to cause some of the refrigerant to condense, conveying the inert gas, still containing some refrigerant into the presence of another absorbent body and maintaining this body at a sufficiently low temperature to cause it to absorb some refrigerant out of the inert gas, conveying the nearly pure inert gas into the presence of the condensed refrigerant to cause the condensed refrigerant to evaporate into the inert gas and produce a cooling effect and conveying the mixture of inert gas and refrigerant so obtained back into the presence of the first mentioned absorbent body, the steps of conveying of the inert gas being brought about under the influence of convection currents resulting from differences in temperature at different parts of the inert gas circuit.

9. The process of producing refrigeration which consists in circulating an inert gas into the presence of a refrigerant laden absorbent body, maintaining the absorbent at a sufficiently high temperature to cause the refrigerant to be given up to the inert gas, conveying the refrigerant laden inert gas away from the absorbent and cooling the same to cause some of the refrigerant to condense, conveying the inert gas, still containing some refrigerant into the presence of another absorbent body and maintaining this body at a sufficiently low temperature to cause it to absorb some refrigerant out of the inert gas, conveying the nearly pure inert gas into the presence of the condensed refrigerant to cause the condensed refrigerant to evaporate into the inert gas and produce a cooling effect and conveying the mixture of inert gas and refrigerant so obtained back into the presence of the first mentioned absorbent body, the difference in temperature between the two bodies of absorbent being maintained by the heat of the sun.

10. The process of producing refrigeration which consists in circulating an inert gas into the presence of a refrigerant laden absorbent body, maintaining the absorbent at a sufficiently high temperature to cause the refrigerant to be given up to the inert gas, conveying the refrigerant laden inert gas away from the absorbent and cooling the same to cause some of the refrigerant to condense, conveying the inert gas, still containing some refrigerant into the presence of another absorbent body and maintaining this body at a sufficiently low temperature to cause it to absorb some refrigerant out of the inert gas, conveying the nearly pure inert gas into the presence of the condensed refrigerant to cause the condensed refrigerant to evaporate into the inert gas and produce a cooling effect and conveying the mixture of inert gas and refrigerant so obtained back into the presence of the first mentioned absorbent body, the difference in temperature between the two bodies of absorbent being maintained by cooling one body below the temperature of the atmosphere and exposing the other body to the atmosphere.

11. Intermittent absorbent refrigerating apparatus including a circuit containing a plurality of adsorber-generators, an evaporator, a plurality of condenser sections located above said evaporator, means for circulating inert gas through portions of the apparatus including the condenser sections and the evaporators, and means for preventing inert gas from flowing directly from any condenser section to said evaporator.

12. Intermittent absorption refrigerating apparatus charged with a refrigerant, an absorbent therefor, and an inert gas, and comprising a plurality of connected vessels, two of which are adapted to function alternately as a generator or an absorber, a third as a condenser and a fourth as an evaporator, means for circulating inert gas in a circuit through said vessels, the flow of gas being through the absorber-generator acting as a generator, the condenser, the absorber-generator acting as an absorber, the evaporator and back to the absorber-generator acting as a generator, said gas flow taking place when the absorber-generator acting as a generator is maintained at a higher temperature than the absorber-generator acting as an absorber.

13. Intermittent absorption refrigerating apparatus having vessels comprising two absorber-generators, a condenser, an evaporator, means for circulating an inert gas through said vessels, the arrangement being such that one absorber-generator can be alternately maintained at a higher temperature than the other absorber-generator and the inert gas will flow from the condenser directly to the absorber-generator being maintained at the lower temperature.

14. The method of cooling a zone below ambient atmospheric temperature which comprises subjecting hydrous acetaldehyde to the heat of the sun to liberate water vapor, conducting said water vapor to a point shielded from the heating effect of the sun and condensing said vapor, passing the liquid thus produced into the presence of a pressure equalizing medium whereby said liquid evaporates and produces a lowering of the ambient temperature, and conducting the resultant gases into the presence of acetaldehyde whereby said water vapor is absorbed.

15. Intermittent absorption refrigeration apparatus employing a refrigerant, an absorbent therefor and an inert gas comprising a first and a second absorber-generator, a condenser, an evaporator and means connecting the same in circuit, a structure overlying the condenser and evaporator and adapted to shield first one and then the other absorber-generator from the heat of the sun whereby when one absorber is exposed to solar heat the other is shielded therefrom by said structure and remains cooler than said first absorber-generator.

16. Absorption refrigeration apparatus of the type employing a refrigerant, an absorbent and an inert gas, said apparatus comprising two absorber-generators coupled in circuit with a condenser and an evaporator, means enclosing said evaporator and positioned between said absorber-generators whereby the relative movement between the earth and the sun will result in the alternate heating of one of said absorber-generators to a higher temperature than the other to produce refrigeration in the vicinity of said evaporator.

17. The method of heating an intermittent absorption refrigeration apparatus having a plurality of bodies of absorbent medium each arranged to absorb and liberate a refrigerant alternately which is dependent on the relative movement between the earth and the sun comprising exposing one of said bodies to radiant solar energy and shielding another of said bodies therefrom and then exposing the shielded body to radiant solar energy while shielding the previously heated body from solar energy, whereby said heated body liberates the refrigerant and the shielded body absorbs the same.

18. The method of energizing an intermittent absorption refrigeration system of the type having a refrigerant medium and at least two bodies of absorbent medium therefor, comprising exposing one of said bodies to radiant solar energy while shielding another body of absorbent therefrom, and periodically reversing the condition of exposure and non-exposure of the bodies to the sun as a result of the relative movement between the earth and the sun, whereby the heated body librates refrigerant and another body absorbs the same.

19. The method of liberating and subsequently absorbing a refrigerant in an intermittent refrigeration system which comprises exposing absorbent medium containing refrigerant to radiant solar energy, passing such refrigerant through a work circuit to other absorbent medium shielded from radiant energy, and reversing said first and second mentioned mediums with respect to the sun as a result of the relative movement of the sun and the earth whereby the cycle is reversed.

20. Intermittent absorption refrigerating apparatus comprising two vessels each containing absorbing substance, a condenser consisting of two banks, each bank having a drain for condensate, an evaporator consisting of two banks, each bank having a condensate inlet and means for circulating an inert gas through one of said vessels, the condenser, the other of said vessels and the evaporator, said circulation being facilitated by maintaining one of said vessels at a higher temperature than the other.

21. Intermittent absorption refrigerating apparatus comprising two vessels, each containing absorbing substance, a condenser, an evaporator, a heat exchanger and means for circulating an inert gas in successive order through one of said vessels, the condenser, the other of said vessels, the heat exchanger, the evaporator, the heat exchanger and back to said one vessel, said circulation being facilitated by maintaining one of said vessels at a higher temperature than the other.

22. Intermittent absorption refrigerating apparatus comprising two absorber-generators, each of which is capable of acting as an absorber or a generator and each containing absorbing substance, a condenser, an evaporator and means for circulating an inert gas through both absorber-generators and the evaporator at the same time, the arrangement being such that one absorber-generator may be periodically maintained at a higher temperature than the other absorber-generator and said gas is circulated by difference in temperature prevailing in the different parts of the gas circuit.

23. Intermittent absorption refrigerating apparatus using methyl alcohol as refrigerant and comprising two vessels, each containing absorbing substance, a condenser, an evaporator and means for circulating an inert gas through both vessels, the condenser and the evaporator at the same time, the arrangement being such that one absorber-generator may be periodically maintained at a higher temperature than the other absorber-generator and said gas is circulated by differences in temperature prevailing in the different parts of the gas circuit.

24. The method of cooling a zone below ambient atmospheric temperature which comprises subjecting a body of an absorbent medium having a greater amount of a refrigerant absorbed in one portion thereof than in another to the heating effect of the sun to drive off refrigerant vapor, passing said vapor out of the effective zone of the sun and liquefying the same, permitting said liquefied refrigerant to evaporate into a pressure equalizing medium to produce a lowering of the ambient temperature, and conducting the mixture of refrigerant and pressure equalizing medium thus produced into the presence of that portion of the absorbent medium which contains the least amount of refrigerant whereby said refrigerant is absorbed.

25. Intermittent absorption refrigerating apparatus charged with a refrigerant, an absorbent therefor, and an inert gas, and comprising a plurality of connected vessels adapted to function as a generator, a condenser, an evaporator, a heat exchanger and an absorber, means for circulating inert gas in a circuit through said vessels, the flow of gas being through the vessel acting as a generator, the condenser, the vessel acting as an absorber, a conduit of the heat exchanger, the evaporator, the second conduit of the heat exchanger and back to the vessel acting as a generator, the arrangement being such that the temperature of the vessel acting as the generator may be maintained at a higher temperature than the vessel acting as an absorber.

EDMUND ALTENKIRCH.